United States Patent [19]

Prukop et al.

[11] Patent Number: 4,793,419

[45] Date of Patent: Dec. 27, 1988

[54] ADDING LIGNOSULFONATE TO CAUSTIC FLOODS TO SHIFT OPTIMAL SALINITY TO A HIGHER SALINITY

[75] Inventors: Gabriel Prukop; Vernon H. Schievelbein, both of Houston, Tex.

[73] Assignee: Texaco, Inc., White Plains, N.Y.

[21] Appl. No.: 140,368

[22] Filed: Jan. 4, 1988

[51] Int. Cl.⁴ .............................................. E21B 43/22
[52] U.S. Cl. .................................... 166/270; 166/274; 166/275; 252/8.554
[58] Field of Search ............... 166/273, 274, 275, 270; 252/8.554

[56] References Cited

U.S. PATENT DOCUMENTS

| | | | |
|---|---|---|---|
| 4,006,779 | 2/1977 | Kalfoglou | 166/275 |
| 4,110,231 | 8/1978 | Swanson | 166/275 X |
| 4,232,738 | 11/1980 | Yen et al. | 166/252 X |
| 4,466,892 | 8/1984 | Chan et al. | 166/270 X |
| 4,479,542 | 10/1984 | Warchol et al. | 166/273 |
| 4,739,041 | 4/1988 | Morrow et al. | 166/275 X |

*Primary Examiner*—George A. Suchfield
*Attorney, Agent, or Firm*—Jack H. Park; Kenneth R. Priem; Harold R. Delhommer

[57] ABSTRACT

The invention is a method for recovering hydrocarbons from an underground hydrocarbon reservoir penetrated by at least one injection well and at least one production well, which comprises injecting into the reservoir through an injection well an aqueous caustic solution comprising greater than 0.1% and less than 1.0% lignosulfonate by weight to shift the optimal salinity for enhanced oil recovery of the caustic solution to a relatively higher salinity, and producing hydrocarbons and other fluids through a production well.

8 Claims, No Drawings

ADDING LIGNOSULFONATE TO CAUSTIC FLOODS TO SHIFT OPTIMAL SALINITY TO A HIGHER SALINITY

BACKGROUND OF THE INVENTION

This invention relates to a method for recovering oil from an underground reservoir by caustic flooding. More particularly, the invention concerns the use of a lignosulfonate to raise the optimal salinity of a caustic flood to a higher salinity and increase oil recovery.

One method of waterflooding for enhanced oil recovery that has see considerable research and development is caustic flooding. Alkaline or caustic flooding uses relatively low concentrations of caustic chemicals such as hydroxides or carbonates to decrease the interfacial tension between the injected fluid and the oil. A considerable number of caustic flooding methods have been tried in the field in reservoirs containing anything from light oils to tar sands.

In caustic flooding, the pH value of the injected flood water is increased by adding a caustic compound. The most common chemical choice is sodium hydroxide because of its ready availability and low cost. Other compounds which may accomplish the same result include potassium hydroxide, ammonium hydroxide, sodium carbonate, potassium carbonate, trisodium phosphate, ammonia, or mixtures thereof. The caustic flooding solutions can range from about 0.1 to 5% or more sodium hydroxide by weight, but typically are less than 1% in field use.

U.S. Pat. No. 3,927,716 discloses an alkaline waterflooding process in which the pH and salinity of the alkaline solution are controlled in relatively narrow ranges. By controlling the salinity of the caustic flood, a lower interfacial tension is achieved between the oil and water of the flood, resulting in a greater recovery efficiency.

Lignosulfonates have been found to have excellent properties of sacrificial agents when added to aqueous flooding systems. They are economically attractive because they are by-products of the pulp industry. Supply is plentiful and product costs are much less than the cost of surfactants employed in enhanced oil recovery floods. The use of various lignosulfonates has been disclosed extensively in the literature.

U.S. Pat. Nos. 4,157,115 and 4,271,906 disclose several methods of using aqueous solutions of lignosulfonate salts as sacrificial agents in surfactant flooding to mitigate the loss of surfactant from the flooding solution to the formation. The use of oxidized lignosulfonates is disclosed in U.S. Pat. Nos. 4,133,385 and 4,196,777. Chrome lignosulfonates as sacrificial agents are described in U.S. Pat. Nos. 4,142,582. 4,172,497 discloses the use of lignosulfonates carboxylated with chloroacetic acid and U.S. Pat. No. 4,172,498 discloses sulfomethylated lignosulfonates as sacrificial agents. U. S. Patent No. 4,479,542 describes a sacrificial after flush method employing lignosulfonates. U.S. Pat, No. 4,627,494 discloses a lignosulfonate and carbohydrate system as a sacrificial agent for aqueous surfactant flooding.

A method of using lignosulfonates to prevent the precipitation of insoluble hydroxides in alkaline flooding solutions is disclosed in U.S. Pat. No. 4,466,892. In this method, at least 1% lignosulfonate is added to the water used for an alkaline waterflood before any caustic compound is added to the water. The explained purpose of adding the lignosulfonate to the injection water is to prevent the formation and precipitation of insoluble compounds formed between divalent ions in the injection water and hydroxide or carbonate ions added by the caustic material. Thus, the patent emphasizes the importance of, and in fact requires that the lignosulfonate be added to the injection water prior to the addition of caustic.

With this use in mind one of ordinary skill in the art would not consider adding lignosulfonate to waters that lack a substantial divalent ion concentration. However, the instant invention demonstrates that lignosulfonates are beneficial to flooding efficiency where divalent ion precipitation is not a problem.

SUMMARY OF THE INVENTION

The invention is a method for recovering hydrocarbons from an underground hydrocarbon reservoir penetrated by at least one injection well and at least one production well, which comprises injecting into the reservoir through an injection well an aqueous caustic solution comprising greater than 0.1% and less than 1.0% lignosulfonate by weight to shift the optimal salinity for enhanced oil recovery of the caustic solution to a relatively higher salinity, and producing hydrocarbons and other fluids through a production well.

DETAILED DESCRIPTION

Caustic flooding in some respects can be considered a specialized case of surfactant flooding for enhanced oil recovery. The organic acids in the oil, which become soap on the addition of caustic, respond to the salinity of the injected flood water much like conventional surfactants in oil and brine systems.

Surfactants are most effective at reducing interfacial tension between oil and brine fluids when the surfactants are used in a particular salinity range. This range is called the "optimal salinity" and is dependent on the specific surfactant, oil, and brine, as well as other variables. At salinities below the optimal salinity, the surfactant is primarily partitioned into the water phase. At salinities above the optimum, the surfactant is primarily in the oil phase. Coreflood experiments have demonstrated a high correlation between optimal salinity and good oil recovery.

In alkaline flooding systems, the caustic compound itself adds to the salinity of the system. Because the organic acids in the oil are very oil soluble, small increases in salinity can partition the soap away from the interface between oil and water, and into the oil where the resulting soaps are ineffective at reducing interfacial tension. Consequently, caustic flooding systems achieve the best or optimum oil recovery efficiency when the caustic flooding system is designed with an optimum salinity for the particular reservoir use.

Unfortunately, reservoir rock consumes large quantities of caustic by chemical reaction and adsorption. If a low concentration of caustic is used in a flood, most of the caustic will be lost to the reservoir rock and little caustic will remain in the alkaline flooding system to recover oil. But the optimal salinities for many caustic flooding systems require a relatively low concentration of caustic.

The present invention offers a solution to this problem of optimal salinities for caustic flooding systems which are frequently too low of a salinity for a practical alkaline flooding system. By adding lignosulfonate to a caustic flooding solution in an amount greater than 0.1% and less than 1.0% by weight, the optimal salinity of the alkaline flooding system is shifted to a relatively higher effective salt concentration. Additional caustic material can then be added to the flooding system to supply that salinity while the system remains at an optimal salinity. The higher concentration of caustic can then more easily propagate through the reservoir in the alkaline flooding system. Preferably, a lignosulfonate is added in amount of about 0.25% to about 0.75% by weight. Preferably, the lignosulfonate is added to the aqueous caustic solution after the solution is made caustic by the addition of an alkaline compound.

Any suitable lignosulfonate material can be used in the practice of this invention. Because of the variations among commercial pulping and sulfonation processes, various lignosulfonates may be more or less suitable for use with the present invention method. Optimization of the amounts used and the particular selection of lignosulfonate material is within the skill of those familiar with the art. Preferred sources and types of lignosulfonates can be readily identified for a particular caustic flood by testing according to the procedure disclosed in the examples.

Various alkaline flooding methods and materials can be used in conjunction with the invention process. The alkaline flooding system may contain a sacrificial agent, and preferably a viscosity increasing polymer. A drive fluid may also be injected into the formation to drive the caustic flooding solution through the reservoir to a production well. Suitable drive fluids are well known to those skilled in the art.

The aqueous caustic solution may be comprised of sodium hydroxide, potassium hydroxide, ammonium hydroxide, sodium carbonate, potassium carbonate, trisodium phosphate, ammonia, or mixtures thereof. Because of cost and ready availability, sodium hydroxide is the most preferred caustic compound.

The following examples will further illustrate the novel use of lignosulfonates with alkaline flooding systems. These examples are given by way of illustration and not as limitations on the scope of the invention. Thus, it should be understood that the composition of the alkaline flooding solution and process steps may be varied to achieve similar results within the scope of the invention.

EXAMPLES 1-4

The invention process of adding lignosulfonate to caustic floods was evaluated for enhanced oil recovery potential in laboratory corefloods. The general procedure was to cut Berea sandstone into 2"×2"×12" cores and cast the cores in an epoxy mold. Each core was evacuated by a vacuum pump and saturated with a brine having 4300 ppm TDS. The cores typically had a 150 ml pore volume, a porosity of about 0.21-0.22%, and a permeability of about 400-600 md.

Each core was flooded at a frontal advance rate of about 10 feet per day with a crude oil having a viscosity of about 120 cp and an acid number of about 2 mg of KOH/g of oil. Each core was then flooded with a brine having a salinity of 3800 ppm TDS at a rate of 2 feet per day for 0.5 pore volumes, and then was immediately switched to chemical flooding. A continuous water flood of 3.0 pore volumes left a waterflood residual saturation of 42.5%.

Caustic flooding slugs were prepared in the amounts of 2.5 pore volumes for Examples 1 and 2 and 0.75 pore volumes for Examples 3 and 4. The caustic solutions contained 1% by weight sodium hydroxide and 2500 ppm of Cyanatrol 960, a trademarked polyacrylamide polymer having a nominal molecular weight of about 15 million sold by American Cyanamid. The corefloods of Examples 2 and 4 also contained 0.5% Lignosite 458 by weight. Lignosite 458 is a trademarked desugared sodium lignosulfonate sold by Georgia Pacific Corp. The makeup water for the caustic slugs had a salinity 3800 ppm TDS and a divalent ion content of 44 mg/L. The divalent ion concentration was low. Thus, precipitation was not expected to be a problem with the makeup water, even in the absence of lignosulfonate. Injection rate for the caustic flood was about 2 feet per day. All corefloods were performed at about 144° F.

Tables I lists the results of the four corefloods. As is evident from the Table, the addition for 0.5% lignosulfonate substantially increased the recovery efficiency of the caustic floods containing 1% sodium hydroxide and 2500 ppm of polyacrylamide. Tertiary recovery efficiency increased a substantial 32% for the 2.5 pore volume corefloods of Examples 1 and 2 and a significant 14% for the 0.75 pore volume corefloods of Examples 3 and 4.

TABLE I

| COREFLOODS WITH 1% NaOH AND 2500 PPM POLYMER | | | | |
|---|---|---|---|---|
| Ex. | Additive | PV | Sof,% | R,%[1] | Er,%[2] |
| 1 | None | 2.5 | 14.5 | 81.0 | 65.9 |
| 2 | 0.5% Lignosulfonate | 2.5 | 5.5 | 92.7 | 87.1 |
| 3 | None | 0.75[3] | 16.0 | 78.5 | 62.4 |
| 4 | 0.5% Lignosulfonate | 0.75[3] | 12.4 | 83.8 | 70.8 |

[1] R = Total oil recovery as percent of original oil in place (OOIP). This includes oil recovered as a result of waterflood.
[2] Er = Tertiary oil recovery as percent of the waterflood residual oil. Waterflood residual was 42.5% of the pore volume.
[3] The caustic slug was displaced with the makeup water as a drive fluid. No caustic or lignosulfonate was added to the drive fluid.

Many other variations and modifications may be made in the concepts described above by those skilled in the art without departing from the concepts of the present invention. Accordingly, it should be clearly understood that the concepts disclosed in the description are illustrative only and are not intended as limitations on the scope of the invention

What is claimed is:

1. A method for recovering hydrocarbons from an underground hydrocarbon reservoir penetrated by at least one injection well and at least one production well, which comprises:
    injecting into the reservoir through an injection well an aqueous caustic solution comprising greater than 0.1% and less than 1.0% lignosulfonate by weight to shift the optimal salinity for enhanced oil recovery of the caustic solution to a relatively higher salinity; and
    producing hydrocarbons and other fluids through a production well.

2. The method of claim 1, wherein the lignosulfonate is added to the aqueous caustic solution after the solution is made caustic by the addition of a caustic compound.

3. The method of claim 1, wherein the lignosulfonate comprises about 0.25% to about 0.75% by weight of the solution.

4. The method of claim 1, wherein the aqueous caustic solution is comprised of sodium hydroxide, potassium hydroxide, ammonium hydroxide, sodium carbonate, potassium carbonate, trisodium phosphate, ammonia, or mixtures thereof.

5. The method of claim 1, further comprising the injection of a drive fluid after the aqueous caustic solution to drive the caustic solution through the reservoir to a production well.

6. The method of claim 1, wherein the caustic solution further comprises a viscosity increasing polymer.

7. The method of claim 1, further comprising increasing the concentration of caustic in the solution while remaining at optimal salinity.

8. A method for recovering hydrocarbons from an underground hydrocarbon reservoir penetrated by at least one injection well and at least one production well, which comprises:
   injecting into the reservoir through an injection well an aqueous sodium hydroxide solution comprising 0.25% to about 0.75% lignosulfonate by weight to shift the optimal salinity for enhanced oil recovery of the caustic solution to a relatively higher salinity;
   recovering hydrocarbons and other fluids through a production well.

* * * * *